US011847918B2

United States Patent
Wienss et al.

(10) Patent No.: US 11,847,918 B2
(45) Date of Patent: Dec. 19, 2023

(54) METHOD FOR THE COMMUNICATION OF AT LEAST TWO USERS OF A NETWORKED TRAFFIC SYSTEM

(71) Applicant: Robert Bosch GmbH, Stuttgart (DE)

(72) Inventors: Andreas Wienss, Eningen Unter Achalm (DE); Tobias Frye, Braunschweig (DE); Alexander Geraldy, Hildesheim (DE); Florian Alexander Schiegg, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/830,616

(22) Filed: Jun. 2, 2022

(65) Prior Publication Data
US 2022/0392348 A1    Dec. 8, 2022

(30) Foreign Application Priority Data
Jun. 8, 2021    (DE) ..................... 10 2021 205 751.9

(51) Int. Cl.
  *G08G 1/16*    (2006.01)
  *G08G 1/01*    (2006.01)
  *H04W 4/40*    (2018.01)
(52) U.S. Cl.
  CPC ........... *G08G 1/166* (2013.01); *G08G 1/0104* (2013.01); *H04W 4/40* (2018.02)
(58) Field of Classification Search
  None
  See application file for complete search history.

(56) References Cited

U.S. PATENT DOCUMENTS

| 9,578,153 | B2* | 2/2017 | Pierfelice | H04W 76/14 |
| 9,855,947 | B1* | 1/2018 | Penilla | H04W 4/027 |
| 2008/0146248 | A1* | 6/2008 | Himmelstein | H04W 4/80 |
| | | | | 455/456.1 |

(Continued)

FOREIGN PATENT DOCUMENTS

| DE | 102012217013 B3 | 3/2014 |
| DE | 102012020297 A1 | 4/2014 |

(Continued)

*Primary Examiner* — Muhammad Adnan
(74) *Attorney, Agent, or Firm* — NORTON ROSE FULBRIGHT US LLP; Gerard Messina (57) ABSTRACT

A method for the communication of at least two users of a networked traffic system. A first user sends pieces of exchange information using a first signal transmission path, the pieces of exchange information including first sensor data of the first user and a code representing the first user. The first user sends the representative code or one further representative code using at least one second signal transmission path. A second user receives the pieces of exchange information via the first signal transmission path. The second user ascertains using a surroundings sensor system second sensor data by detecting surroundings. The second user receives using the surroundings sensor system the code sent via the second signal transmission path. The second user associates the first sensor data and the second sensor data with one another with the aid of the representative code and/or with the aid of the further representative code.

15 Claims, 4 Drawing Sheets

(56) References Cited

U.S. PATENT DOCUMENTS

| | | | |
|---|---|---|---|
| 2012/0096490 A1* | 4/2012 | Barnes, Jr. | G06Q 10/02 |
| | | | 725/34 |
| 2017/0345227 A1* | 11/2017 | Allen, Jr. | G06F 16/951 |
| 2019/0037499 A1* | 1/2019 | Son | G08G 1/096791 |
| 2019/0052637 A1* | 2/2019 | Dean | H04W 12/04 |
| 2019/0204840 A1* | 7/2019 | Park | G01C 21/3667 |
| 2020/0153636 A1* | 5/2020 | Takada | H04W 4/40 |
| 2020/0184808 A1* | 6/2020 | Ewert | G08G 1/0145 |
| 2020/0192355 A1* | 6/2020 | Lu | G08G 1/09675 |
| 2020/0331465 A1* | 10/2020 | Herman | G08G 1/161 |
| 2021/0056852 A1* | 2/2021 | Lund | G08G 1/04 |
| 2021/0171042 A1* | 6/2021 | Hayakawa | B60W 30/18163 |
| 2022/0051149 A1* | 2/2022 | Livne-Simha | H04W 4/027 |
| 2022/0225342 A1* | 7/2022 | Zhao | H04W 4/40 |
| 2022/0286862 A1* | 9/2022 | Layouni | H04W 4/80 |
| 2023/0224868 A1* | 7/2023 | Li | H04W 4/40 |
| | | | 370/329 |

FOREIGN PATENT DOCUMENTS

| | | | |
|---|---|---|---|
| DE | 102016217531 A1 | 3/2018 | |
| DE | 102019003169 A1 | 6/2020 | |
| EP | 2961143 A1 * | 12/2015 | ........... G01C 21/362 |
| EP | 3582464 A1 | 12/2019 | |
| EP | 3716245 A1 * | 9/2020 | |
| EP | 3371800 B1 | 10/2020 | |
| EP | 3767976 A1 * | 1/2021 | ............... G06F 7/14 |
| WO | WO-2022094584 A1 * | 5/2022 | ........... H04B 1/3816 |

* cited by examiner

METHOD FOR THE COMMUNICATION OF AT LEAST TWO USERS OF A NETWORKED TRAFFIC SYSTEM

CROSS REFERENCE

The present application claims the benefit under 35 U.S.C. § 119 of German Patent Application No. DE 10 2021 205 751.9 filed on Jun. 8, 2021, which is expressly incorporated herein by reference in its entirety.

BACKGROUND INFORMATION

The present invention relates to a method for the communication of at least two users of a networked traffic system and to a networked traffic system.

The networking of road users in a traffic system, for example, with the aid of a data exchange via a so-called "vehicle-to-everything" (in short, V2X) communication or the like is in the related art. In this case, vehicles or also other road users are able to exchange pieces of information with one another. By associating these exchanged data with inherent sensor data, an individual vehicle is able to obtain additional valuable pieces of information about its surroundings or about the entire traffic system. The exchanged data may include, for example, motion data, such as speed, driving direction, navigation destination, position or state data such as, for example, vehicle type. This means, data may also be exchanged with one another that are obtained with the aid of a surroundings sensor system of the respective vehicle. However, such data may invariably include inaccuracies, for example, as a result of the sensor system itself, or as a result of surroundings conditions.

This may mean that portions of the exchanged data include significant errors.

SUMMARY

A method according to the present invention, compared to the related art, has an improved possibility for associating pieces of information exchanged in a networked traffic system. In this way, users of the traffic system are able to obtain particularly accurate and reliable data. This is achieved by a method for the communication of at least two users of a networked traffic system. In accordance with an example embodiment of the present invention, in the method, a first user sends pieces of exchange information with the aid of a first signal transmission path. The pieces of exchange information in this case include first sensor data of the first user as well as an individual code representing the first user. The first user sends the code in this case also with the aid of at least one further second signal transmission path. Alternatively to the representative code, the first user may preferably send a further code representing, for example, another user, with the aid of the second signal transmission path. In this case, the further representative code is preferably also sent with the pieces of exchange information via the first signal transmission path. A second user of the networked traffic system receives the pieces of exchange information via the first signal transmission path. In addition, the second user ascertains, with the aid of a surroundings sensor system, second sensor data by detecting surroundings, the second user, with the aid of the surroundings sensor system, also receiving the code sent via the second signal transmission path. With the aid of the representative code and/or with the aid of the further represen-
tative code, the second user then associates the first sensor data and the second sensor data with one another.

Pieces of exchange information in this case may be considered to be arbitrary pieces of information or data, which the first user may convey to the second user. The pieces of exchange information include at least the individual code, which may be, for example, a pre-defined characteristic character string, which is suitable for unambiguously characterizing the first user as well as the sensor data.

Sensor data in this case are considered to be arbitrary data, which may be generated with the aid of sensors, for example, of a surroundings sensor system, of the corresponding user. The sensor data preferably include at least position data, which indicate a position of the corresponding user, and/or motion data, which indicate a movement of the corresponding user, and/or surroundings data, which include pieces of information about surroundings from the perspective of the corresponding user. For example, the sensor data may include an instantaneous position, a speed, a movement direction, a vehicle type of the user, and/or objects in the surroundings detected by the user.

Furthermore, a signal transmission path is considered to be an interface for communication, i.e., for exchanging data, between the two users.

In other words, in the method according to the present invention, sensor data together with an individual code are emitted by the first user as pieces of exchange information via the first signal transmission path, so that a second user is able to receive these. The individual code is also sent via a second signal transmission path, which differs from the first signal transmission path, so that the second user is able to receive the code also independently of the first signal transmission path. This reception in this case takes place via the surroundings sensor system of the second user. A surroundings sensor system in this case may preferably be an arbitrary sensor system for detecting sensor data as well as a radio module for receiving radio signals. In this way, the second user is able to simply assign the received pieces of exchange information to its own detected second sensor data and associate them with one another, i.e., combine them with one another. Deviations or errors in one of the sensor data may be reduced or avoided as a result. For example, an erroneous or inaccurate localization by inaccurate position sensors, which may occur, for example, in the case of a GPS sensor with poor reception, as well as between high street canyons or in a tunnel, are compensated for by the method. A particularly accurate set of sensor data may thus be provided by the association.

Preferred refinements of the present invention are disclosed herein.

The first user is preferably a vulnerable road user. Vulnerable road users are considered to be road users who bear a particular risk in road traffic since, for example, they are not surrounded by a protective shell such as, for example, a body of a closed automobile. Vulnerable road users are considered to be, in particular, pedestrians, bicycles and motorcycles. The vulnerable road user is particularly preferably considered to be an electric bicycle. In the case of an electric bicycle, in particular, the method yields the advantage that the electric bicycle is able to be particularly reliably recognized by the second user and categorized in the traffic system. As a result of the improved association with the aid of the code sent on the different signal transmission paths, the electric bicycle is able to be particularly reliably and unambiguously recognized, even in high vehicle densities, i.e., for example, in the case of a multitude of bicycles or vehicles within a small area of the traffic system.

The second road user is particularly preferably a vehicle, preferably a motor vehicle. Preferably alternatively, the second user is a preferably stationary infrastructure facility, i.e. fixedly situated in the traffic system. Such an infrastructure facility may, for example, be a traffic guidance system, such as a traffic light system, or an arbitrary other facility, which is configured for communication with other road users.

The first signal transmission path is based preferably on a radio transmission, for example, with the aid of mobile radio communication. The data transmission takes place, in particular, with the aid of the first signal transmission path with the aid of a V2X interface (V2X: short for vehicle-to-everything). The V2X interface may be designed as a Wifi interface, a 5G interface and/or as a Bluetooth interface. The V2X interface may be designed preferably as a DSRC interface and/or as a C-V2X interface. Thus, a simple data transmission between the users may also take place over longer distances and regardless of obstacles.

The second signal transmission path is particularly preferably designed in such a way that a signal transmission is possible only with a clear optical view between the first user and the second user. This means, a conveyance of the code with the aid of the second signal transmission path requires a clear optical view between the two users, so that a transmission is not possible if an obstacle blocking the clear optical view is located between the two users. As a result, a particularly simple and accurate association of the data may take place, in particular, since the second sensor data are detected preferably also based on a clear optical view. The second signal transmission path is based preferably on a light signal transmission, preferably with the aid of infrared signals. In this case, the code may be transmitted, in particular, in the form of a pre-defined blink pattern, also referred to as flickering. Alternatively or in addition, the second signal transmission path may be based on a transmission with the aid of LIDAR signals. As a result, a direct and unambiguously recognizable transmission of the code may take place in a particularly simple and efficient manner.

The second signal transmission path is based preferably on a radar transmission. As a result, the code may be transmitted also directly with a clear optical view and, in particular, also via reflections.

The first user further preferably sends the code with the aid of multiple second signal transmission paths. This means, the code is emitted simultaneously over multiple different communication paths. This may particularly easily and reliably ensure that the second user is able to clearly receive the code over at least one of the multiple second signal transmission paths.

The pieces of exchange information preferably include Cooperative Awareness Messages and/or Vulnerable Road User Awareness Messages and/or Collective Perception Messages. Thus, pieces of information may be exchanged in the networked traffic system in a particularly targeted manner, in order to enable an unambiguous and efficient communication and, in particular, an optimal traffic flow.

The code and/or the pieces of exchange information are particularly preferably conveyed by the first user indirectly via a third user to the second user. The third user may, for example, be a vulnerable road user or a vehicle or an infrastructure facility. The third user may preferably include a further surroundings sensor system, with the aid of which the third user ascertains sensor data by detecting the surroundings. The third sensor data may also be conveyed and/or associated. As a result of the indirect transmission via the third user, the first user and the second user, for example, are able to communicate with one another over a particularly long distance. Alternatively or in addition, a larger volume of [pieces of] data may be linked with one another via the third user.

The second user preferably conveys the first sensor data and second sensor data associated with one another back to the first user. In this way, the first user is able to obtained improved pieces of information about itself such as, for example, an optimized location of itself or of other objects in the traffic system.

The code is further preferably randomly generated by the first user. This may enable a reliable identification with simultaneous anonymization.

The code is particularly preferably regenerated by the first user in predetermined time intervals, in particular, periodically. This may particularly reliably ensure that an anonymized code is provided. This also results in the avoidance of possible overlaps with identical codes when a multitude of vehicles are located in the surroundings, each of which emits a unique code.

The code is preferably regenerated by the first user when the first user recognizes an identical code in the surroundings. For this purpose, the first user, in particular, monitors the surroundings with the aid of a surroundings sensor system. This may ensure that the first user actually emits a unique code individually representative of the first user at least within the range of the surroundings sensor system of the first user.

The further representative code is particularly preferably designed to be shorter than the representative code. The code preferably includes as few bits as possible but, depending on the number of similar objects, as many bits as is necessary for a differentiation. Particularly preferably the code includes at least 4 bits. A particularly simple and efficient system may be provided in this way, since the code may be conveyed, for example, with the aid of light signals, which require only a minimal total duration for displaying the code. The code further preferably includes at least 16 bits. This may enable an unambiguous identification of the users even given a high density of users in the traffic system.

The present invention further includes a networked traffic system. In accordance with the present invention, the networked traffic system is preferably configured to carry out the method in accordance with the present invention. In accordance with an example embodiment of the present invention, the networked traffic system includes one first communication unit of one first user of the networked traffic system, the first communication unit being configured to send pieces of exchange information with the aid of one first signal transmission path.

The pieces of exchange information in this case include first sensor data of the first user, which are detected preferably with the aid of a surroundings sensor system of the first user, and an individual code representing the first user. The networked traffic system further includes a signal unit of the first user, which is configured to send the representative code or a further representative code also with the aid of at least one further second signal transmission path, and one second communication unit of a second user of the networked traffic system, the second communication unit being configured to receive the pieces of exchange information via the first signal transmission path. The networked traffic system further includes a surroundings sensor system of the second user, which is configured to ascertain second sensor data by detecting surroundings of the second user and to receive the code sent via the second signal transmission path. In addition, the networked traffic system includes a control device of the second user, which is configured to associate the first sensor data and the second sensor data with one another with the aid of the representative code and/or with the aid of the further representative code.

BRIEF DESCRIPTION OF THE DRAWINGS

The present invention is described below with reference to exemplary embodiments in conjunction with the figures. In the figures, functionally identical components are marked in each case with identical reference numerals.

DETAILED DESCRIPTION OF EXAMPLE EMBODIMENTS

Figure 1:
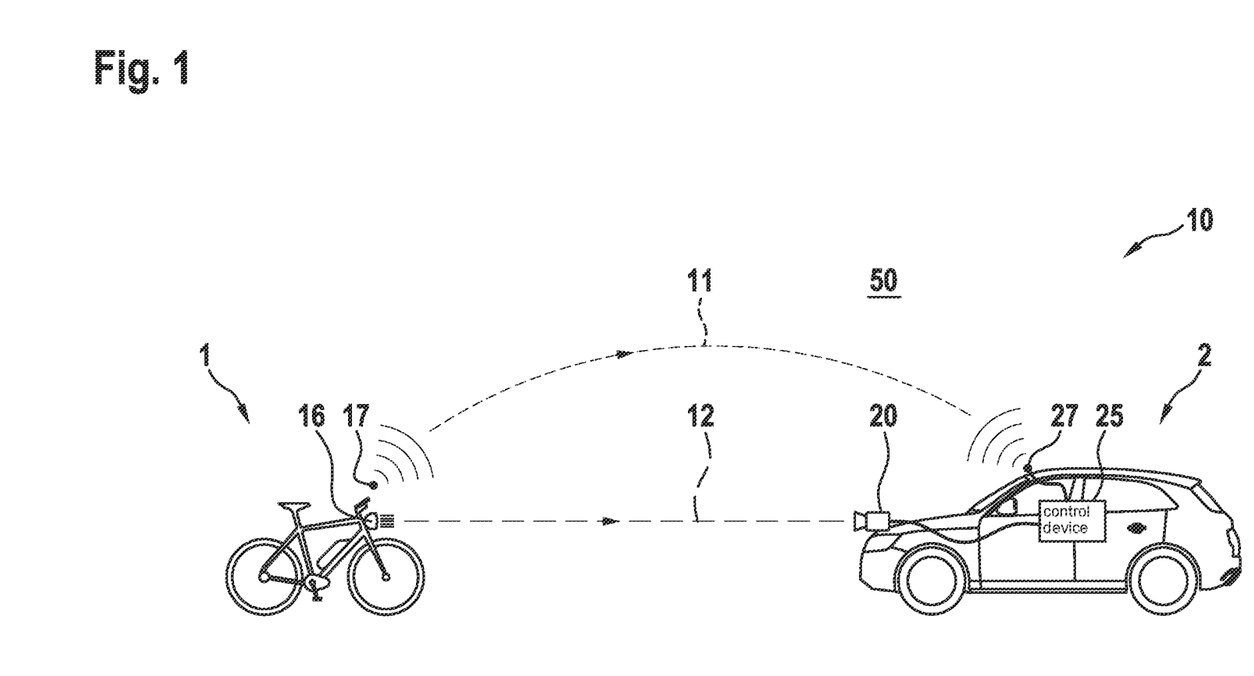
FIG. 1 shows a simplified schematic view of a method for the communication of users of a networked traffic system according to one first exemplary embodiment of the present invention.
Figure 2:
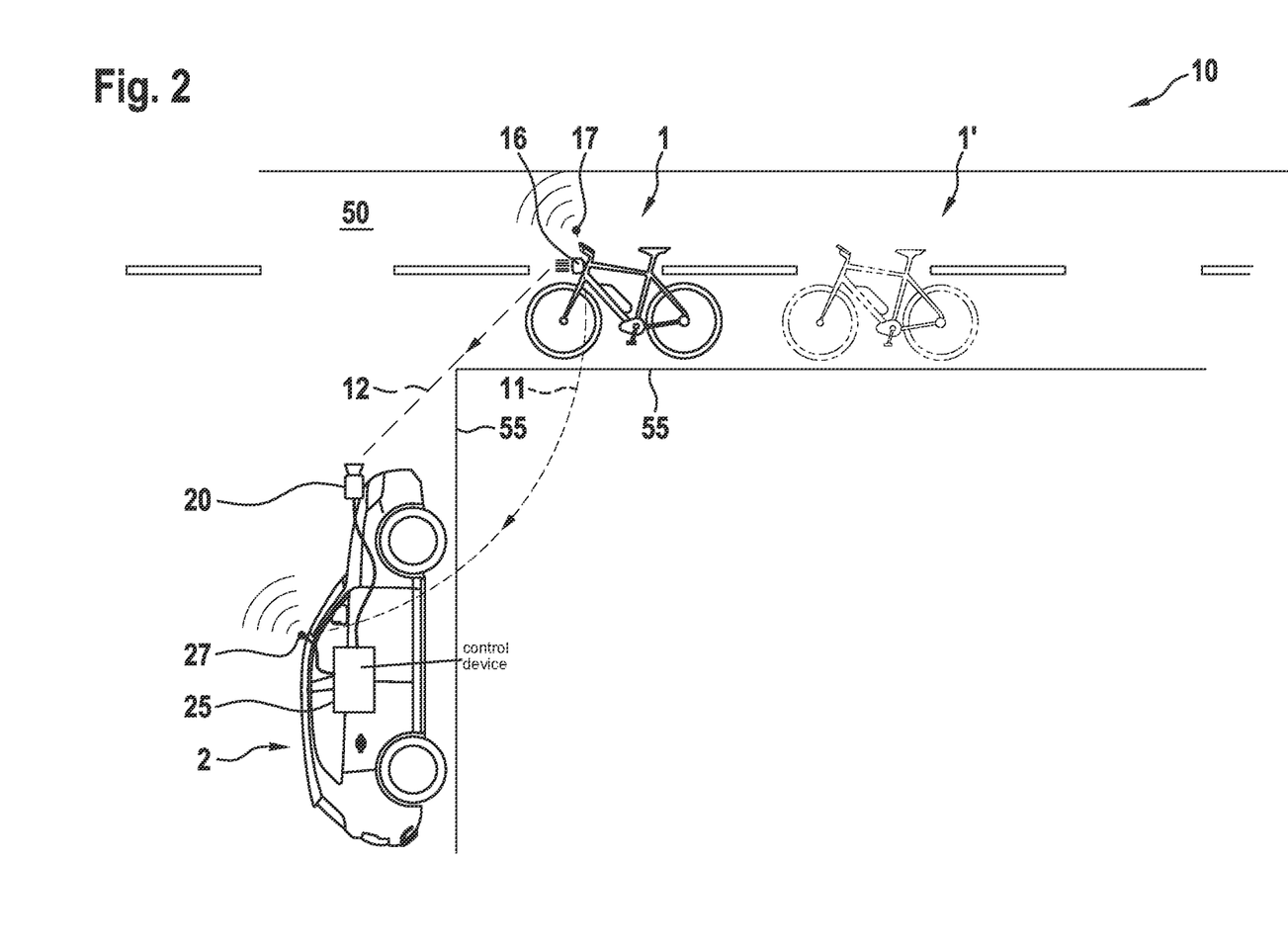
FIG. 2 shows an alternative view of the method of FIG. 1.

FIGS. 1 and 2 show a simplified schematic view of a method for the communication of two users 1, 2 of a networked traffic system 10. A first user 1 in this case is an electric bicycle and a second user 2 is a motor vehicle.

First user 1 includes a first communication unit 17. Second user 2 includes a second communication unit 27. With the aid of the two communication units 17, 27, the two users 1, 2 are able to exchange data with one another. The data exchange takes place via a first signal transmission path 11, which is based on a radio transmission, more specifically, on a V2X interface.

Via first signal transmission paths 11, the two users 1, 2 are able to exchange arbitrary pieces of information, such as preferably Cooperative Awareness Messages and/or Vulnerable Road User Awareness Messages and/or Collective Perception Messages, on the basis of which the respectively receiving user 1, 2 is able to obtain pieces of information about traffic system 10.

In the first exemplary embodiment, first user 1 sends pieces of exchange information via first signal transmission path 11 to second user 2. The pieces of exchange information include first sensor data of first user 1, which have been detected, in particular, with the aid of a surroundings sensor system of the first user. The first sensor data preferably include one or multiple of the following pieces of information about first user 1: instantaneous position, speed, driving direction, driving destination, vehicle type, and objects in surroundings 50 detected by first user 1.

The pieces of exchange information also include an individual code generated by first user 1, which represents first user 1.

In the method, the code is emitted by first user 1 also with the aid of a signal unit 16 via at least one further second signal transmission path 12. Signal unit 16 in this case is configured to emit the code in the form of light signals, preferably infrared light signals.

The light signals emitted by signal unit 16 of first user 1, which contain the code, may be received by a surroundings sensor system 20 of second user 2 via second signal transmission path 12.

Surroundings sensor system 20 of second user 2 in this case is also configured to ascertain second sensor data by detecting surroundings 50.

Second user 2 also includes a control device 25, which is connected to second communication unit 27 and to surroundings sensor system 20. Control device 20 is configured in this case to associate with the aid of the code the first sensor data received via first signal transmission path 11 and the second sensor data detected with the aid of surroundings sensor system 20 with one another. Because the code unambiguously representing the first user is received via both signal transmission paths 11, 12, respectively, this association is able to be particularly efficiently and unambiguously carried out, since second user 2 is able to unambiguously assign first user 1 with the aid of the code in the respective sensor data in a particularly simple manner.

The method is particularly advantageous when inaccuracies or errors are present in the sensor data, which may periodically occur in sensor systems for detecting surroundings 50. For example, a localization accuracy in particular surroundings 50, such as between street canyons, may be impaired, in particular, if the localization takes place by determining the instantaneous position with the aid of a localization system, for example, a GPS system. The advantage of the present method is described for this example below with reference to FIG. 2.

FIG. 2 in this case shows a traffic situation, in which first user 1 and second user 2 meet one another at a roadway intersection, i.e., are driving toward one another and arrive essentially simultaneously at the roadway intersection. Located next to the roadway are, in each case, obstacles 55 such as, for example, buildings, which restrict a direct view of the two users 1, 2 to one another. This means, for example, the two users 1, 2 are able to mutually recognize one another only belatedly when optical contact is made, for example, with the aid of camera sensors and/or LIDAR sensors and/or radar sensors or the like.

One case is represented in FIG. 2, in which a great inaccuracy of the ascertained instantaneous position 1' of first user 1 is present. Instantaneous position 1' ascertained by first user 1 with the aid of the surroundings sensor system is represented as a dashed line in this case. As is apparent in FIG. 2, ascertained position 1' in the case shown is situated significantly further away from the intersection than actual position 1.

First user 1 sends the pieces of exchange information, i.e., its sensor data, including among others, ascertained position 1' and the individual code, via first signal transmission path 11 to second user 2. The transmission in this case may take place already before direct optical contact is made between the two users 1, 2, based on the radio transmission.

As soon as the direct optical contact, i.e., a clear optical view, between first user 1 and second user 2 is made, as represented in FIG. 2, second user 2 also receives the code emitted by signal unit 16 of first user 1 with the aid of its surroundings sensor system 20 via second signal transmission path 12. Second user 2 is now also able to detect first user 1 itself with the aid of its surroundings sensor system 20. In this case, the detection of second user 2, in particular, takes place via the same second signal transmission path 12, in order to facilitate an unambiguous assignment of the code. This means, in the case of a code transmitted as a light signal, the detection of the code as well as of user 2 takes place with the aid of a camera that is at least one part of surroundings sensor system 20.

Second user 2 is thus able to easily associate the received first sensor data of first user 1 with the second sensor data detected with the aid of surroundings sensor 20 itself based on the code. As a result, second user 2 is able, in particular, to correct received position 1' of first user 1 based on the second sensor data. This is particularly advantageously possible if, in addition, pieces of information about the accuracy or reliability of the respective sensor data are present.

The method thus makes it possible in the case described for second user 2 to be able to assign first user 1 unambiguously to its sent first sensor data, in particular, without second user 2 erroneously presuming a further unknown user at the actual position of first user 1 due to the inaccurate position data of first user 1.

Figure 3:
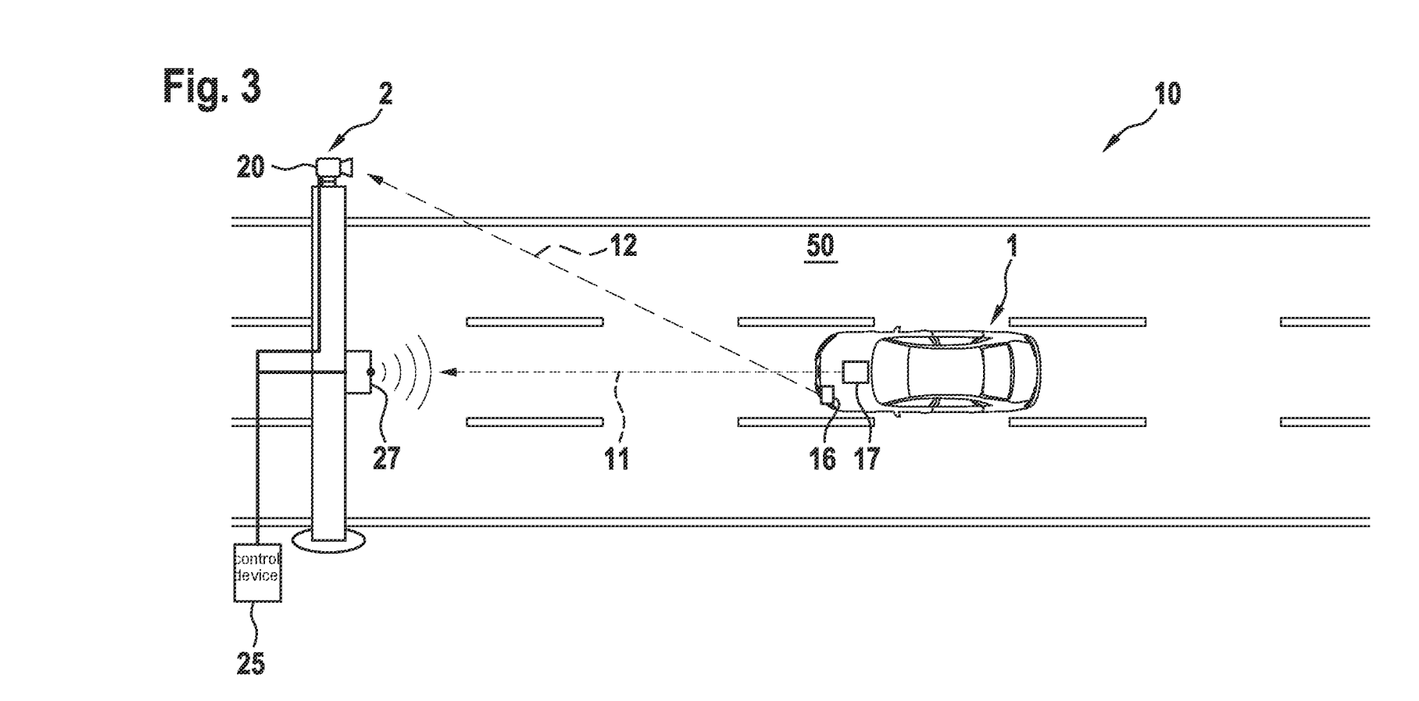
FIG. 3 shows a simplified schematic view of a method for the communication of users of a networked traffic system according to a second exemplary embodiment of the present invention.

FIG. 3 shows a simplified schematic view of a method for the communication of users 1, 2 of a networked traffic system 10 according to one second exemplary embodiment of the present invention. The second exemplary embodiment corresponds essentially to the first exemplary embodiment of FIGS. 1 and 2, with the difference that other users 1, 2 are present. In the second exemplary embodiment, first user 1 is a motor vehicle and second user 2 is an infrastructure facility, which is situated in a fixed or stationary manner in surroundings 50.

The exchange of data in the second exemplary embodiment takes place similarly to the first exemplary embodiment.

The associated sensor data may be advantageously further processed by second user 2 and, for example, provided to further users (not shown) of traffic system 10. It is further advantageous if second user 2 conveys the associated sensor data back to first user 1. In this way, first user 1 is able to continue to use subsequently corrected sensor data with improved accuracy.

Figure 4:
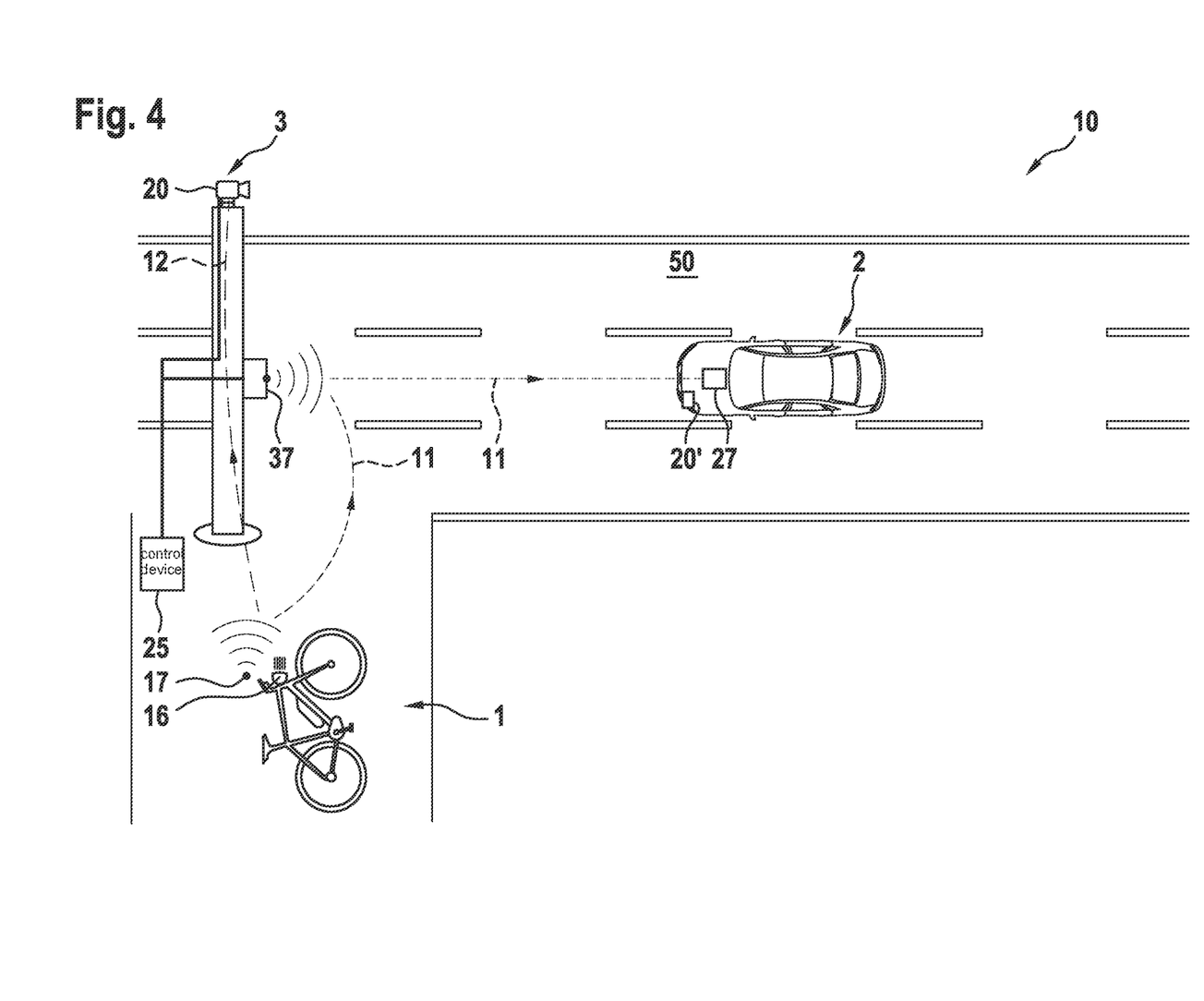
FIG. 4 shows a simplified schematic view of a method for the communication of users of a networked traffic system according to a third exemplary embodiment of the present invention.

FIG. 4 shows a simplified schematic view of a method for the communication of users 1, 2 of a networked traffic system 10 according to one third exemplary embodiment of the present invention. The third exemplary embodiment corresponds essentially to the first exemplary embodiment of FIGS. 1 and 2, with the difference that a third user 3 is also provided. Third user 3 in this case is an infrastructure facility, which includes a surroundings sensor system 20 and a third communication unit 37.

In the third exemplary embodiment, the pieces of exchange information as well as the code are conveyed by first user 1 indirectly via third user 3 to second user 2. In this case, third user 3 receives the code via second signal transmission path 12 with the aid of its surroundings sensor system 20, and also receives with the aid of third communication unit 37 the pieces of exchange information via first signal transmission path 11.

Third user 3 is subsequently able to associate the received first sensor data with third sensor data detected with the aid of its surroundings sensor system 20, or alternatively without associating them, to send them further to second user 2. The conveyance of the pieces of information to second user 2 in this case may take place exclusively via first signal transmission path 11.

Second user 2 is subsequently able to associate the received data again with second sensor data detected, for example, with the aid of its surroundings sensor system 20'. As a result, a particularly high degree of accuracy of the data may be provided and, in addition, an exchange of data may take place as a result of the indirect conveyance over particularly long distances.

What is claimed is:

1. A method for the communication of at least two users of a networked traffic system, the method comprising the following steps:
   sending, by a first user device, pieces of exchange information using at least one first signal transmission path, the pieces of exchange information including first sensor data of the first user device and a code representing the first user device;
   sending, by the first user device, the representative code or one second representative code using at least one second signal transmission path;
   receiving, by a second user device, the pieces of exchange information via the at least one first signal transmission path;
   detecting, by the second user device, using a surroundings sensor system, second sensor data by detecting surroundings, the second user device via the surroundings sensor system receiving the representative code and/or the second representative code sent via the at least one second signal transmission path; and
   associating, by the second user device, the first sensor data and the second sensor data with one another using the representative code and/or using the second representative code.

2. The method as recited in claim 1, wherein the first user device is a vulnerable road user, the vulnerable road using being an electric bicycle.

3. The method as recited in claim 1, wherein the second user device is a motor vehicle or an infrastructure facility.

4. The method as recited in claim 1, wherein the at least one first signal transmission path is based on a radio transmission using a V2X interface.

5. The method as recited in claim 1, wherein the at least one second signal transmission path permits a signal transmission only with a clear optical view between the first user device and the second user device, the second signal transmission path being based on a light signal transmission using infrared signals and/or LIDAR signals.

6. The method as recited in claim 1, wherein the at least one second signal transmission path is based on a radar transmission.

7. The method as recited in claim 1, wherein the first user device sends the code using multiple second signal transmission paths.

8. The method as recited in claim 1, wherein the pieces of exchange information include Cooperative Awareness Messages and/or Vulnerable Road User Awareness Messages and/or Collective Perception Messages.

9. The method as recited in claim 1, wherein the code and/or the piece of exchange information is conveyed by the first user device indirectly via a third user device to the second user device.

10. The method as recited in claim 1, wherein the second user device conveys the first sensor data and the second sensor data associated with one another back to the first user device.

11. The method as recited in claim 1, wherein the code is randomly generated by the first user device.

12. The method as recited in claim 1, wherein the code is regenerated by the first user device in predetermined time intervals.

13. The method as recited in claim 1, wherein the code is regenerated by the first user device when the first user device recognizes an identical code in the surroundings.

14. The method as recited in claim 1, wherein the second representative code is shorter than the representative code.

15. A networked traffic system, comprising:
- a first communication unit of a first user device of the networked traffic system, the first communication unit configured to send pieces of exchange information using at least one first signal transmission path, the pieces of exchange information including first sensor data of the first user device and a code representing the first user device;
- a signal unit of the first user device, which is configured to send the representative code or a second representative code using at least one second signal transmission path;
- a second communication unit of a second user device of the networked traffic system, the second communication unit configured to receive the pieces of exchange information via the at least one first signal transmission path;
- a surroundings sensor system of the second user device, configured to ascertain second sensor data by detecting surroundings and to receive the representative code and/or the second representative code sent via the at least one second signal transmission path; and
- a control device of the second user device, configured to associate the first sensor data and the second sensor data with one another using the representative code and/or using the second representative code.

* * * * *